(12) United States Patent
Schoch et al.

(10) Patent No.: US 8,511,642 B2
(45) Date of Patent: Aug. 20, 2013

(54) CLOSING UNIT FOR A VACUUM VALVE

(75) Inventors: Stefan Schoch, Salez (CH); Andreas Mark, Feldkirch (AT); Eligio Belleri, Balzers (CH)

(73) Assignee: VAT Holding AG, Haag (CH)

( * ) Notice: Subject to any disclaimer, the term of this patent is extended or adjusted under 35 U.S.C. 154(b) by 360 days.

(21) Appl. No.: 12/910,901

(22) Filed: Oct. 25, 2010

(65) Prior Publication Data

US 2011/0095218 A1    Apr. 28, 2011

(30) Foreign Application Priority Data

Oct. 27, 2009  (AT) ................................ A 1695/2009

(51) Int. Cl.
*F16K 3/00*    (2006.01)
*F16K 25/00*   (2006.01)

(52) U.S. Cl.
USPC ............ 251/327; 251/326; 251/193; 251/195

(58) Field of Classification Search
USPC .................................. 251/193, 195, 326, 327
See application file for complete search history.

(56) References Cited

U.S. PATENT DOCUMENTS

| | | |
|---|---|---|
| 3,017,158 A | 1/1962 | Hansen et al. |
| 6,095,741 A | 8/2000 | Kroeker et al. |
| 6,267,545 B1 | 7/2001 | Mooring et al. |
| 6,390,448 B1 | 5/2002 | Kroeker et al. |
| 6,471,181 B2 | 10/2002 | Duelli |
| 6,564,818 B2 | 5/2003 | Koreker et al. |
| 6,601,824 B2 | 8/2003 | Koreker et al. |
| 6,913,243 B1 | 7/2005 | Tomasch |
| 7,059,583 B2 | 6/2006 | Tomasch |
| 7,128,305 B2 | 10/2006 | Tomasch |
| 7,134,642 B2 | 11/2006 | Seitz |
| 2005/0092953 A1 | 5/2005 | Hayashi et al. |

FOREIGN PATENT DOCUMENTS

| | | |
|---|---|---|
| DE | 2827170 | 10/1980 |
| DE | 8703105 | 7/1987 |
| DE | 4026737 | 2/1992 |
| EP | 0770784 | 5/1997 |
| FR | 1027830 | 5/1953 |
| GB | 2277943 A * | 11/1994 |
| JP | 2007309337 | 11/2007 |
| WO | 2009070824 | 6/2009 |

\* cited by examiner

*Primary Examiner* — John K Fristoe, Jr.
*Assistant Examiner* — Kevin Barss
(74) *Attorney, Agent, or Firm* — Volpe and Koenig, P.C.

(57) ABSTRACT

A closing unit for a vacuum valve includes a first valve plate (7) for closing a first valve opening (2) of the vacuum valve, a second valve plate (8) for closing a second valve opening (3) of the vacuum valve, and a carrier plate (19) that lies between the valve plates (7, 8) to which the valve plates (7, 8) are fastened detachably. For fastening a corresponding valve plate (7, 8) to the carrier plate (19), at least one clamping piece (20, 21) is used by which interacting clamping surfaces (22-26) are clamped with each other. Of the interacting clamping surfaces (22-26), at least one is constructed as an angular surface by which the corresponding valve plate (7, 8) is pressed against the carrier plate (19).

17 Claims, 7 Drawing Sheets

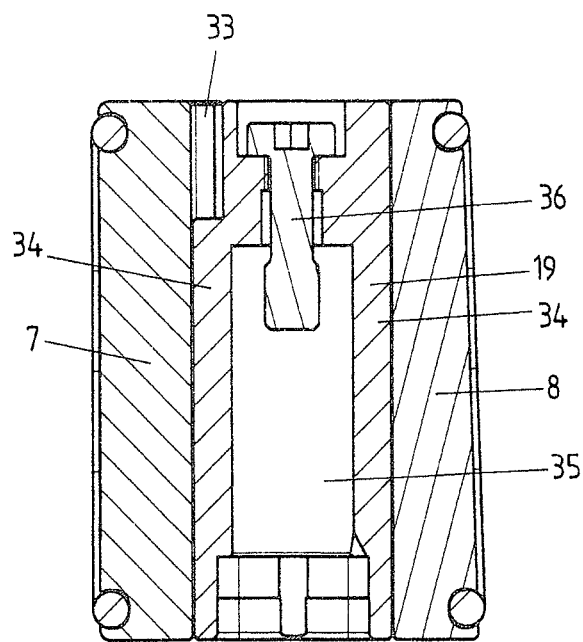
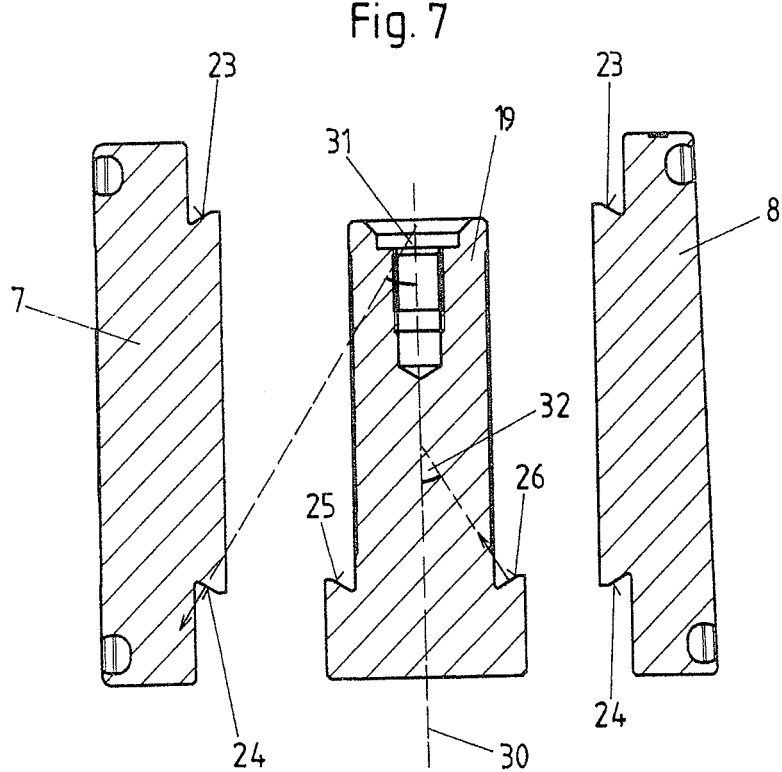

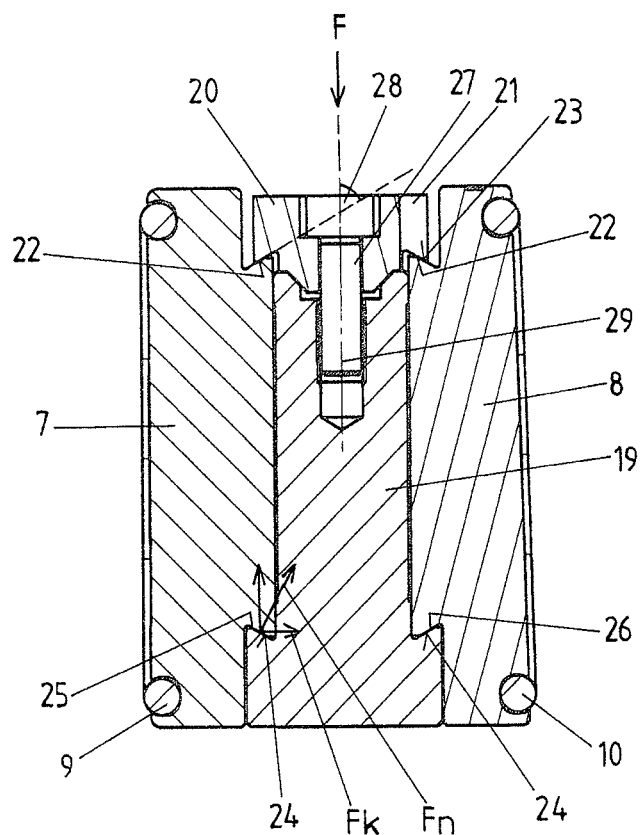
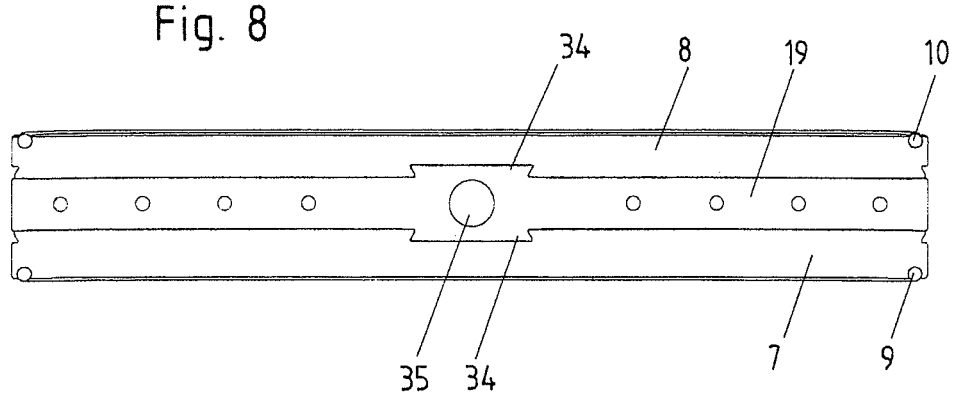

CLOSING UNIT FOR A VACUUM VALVE

CROSS-REFERENCE TO RELATED APPLICATIONS

This application claims the benefit of Austrian Patent Application No. A1695/2009, filed Oct. 27, 2009, which is incorporated herein by reference as if fully set forth.

BACKGROUND a) Field of the Invention

The invention relates to a closing unit for a vacuum valve comprising a first valve plate for closing a first valve opening of the vacuum valve and a second valve plate for closing a second valve opening of the vacuum valve. The invention further relates to a vacuum valve comprising a valve housing with a first valve opening that is surrounded by a first valve seat, a second valve opening that is surrounded by a second valve seat, and a closing unit that has a first valve plate for closing the first valve opening and a second valve plate for closing the second valve opening. The invention further relates to a valve plate for attaching to a carrier plate of a closing unit for a vacuum valve.

b) Description of Related Prior Art

A vacuum valve that has a valve housing with first and second valve openings that can be alternatively closed by means of first and second valve plates is known from U.S. Pat. No. 6,390,448 B1 and U.S. Pat. No. 6,913,243 B1. The two valve plates are held on a valve rod or an end piece attached to the valve rod, wherein the attachment is realized by a swivel pin, so that the angular position of a corresponding valve plate is adjustable relative to the valve rod. In the opened state of the vacuum valve, the valve rod is retracted and the two valve openings are released. For closing the vacuum valve, the two valve plates are moved initially starting from the open position into an intermediate position in which they lie between the two valve openings, wherein they are lifted from the valve openings. Starting from this intermediate position, by pivoting the valve rod about a pivoting axis at a right angle to the valve rod, either the first valve opening is closed by the first valve plate or the second valve opening is closed by the second valve plate. For example, in the closed state of the first valve opening, the second valve plate could be serviced, e.g., for exchanging the seal, and vice versa.

From U.S. Pat. No. 6,095,741, a vacuum valve with first and second valve openings is further known that can be closed by first and second valve plates, wherein each of the valve plates is connected to a separate valve rod.

A vacuum valve with first and second valve plates that are adjustable independent of each other emerges from WO 2009/070824 A1. One of the valve plates is carried by a carrier unit that is attached to valve rods. The carrier unit is equipped with several actuators for adjusting the valve plate and the valve plate is connected to these actuators by means of guides that are constructed like a kind of dovetailed guide, so that the valve plate can be removed from the actuators.

A holder of a valve plate on a valve rod in which the valve plate can be pivoted to a limited extent about the axis of the valve plate, in order to adapt the position of the valve plate to the valve seat, emerges from U.S. Pat. No. 7,134,642 B2.

From U.S. Pat. No. 6,471,181 B2, a holder of a valve plate on a valve rod is known in which the valve plate can be tilted about an axis that is at a right angle to the axis of the valve rod.

SUMMARY

The object of the invention is to provide a closing unit of the type named above in which a corresponding valve plate can be assembled and disassembled easily and in which a corresponding valve plate is fixed with stability in the mounted state and is positioned with sufficient accuracy.

This is achieved according to the invention by a closing unit comprising:

a first valve plate for closing a first valve opening of the vacuum valve, a second valve plate for closing a second valve opening of the vacuum valve, a carrier plate that lies between the valve plates and to which the valve plates are fastened detachably, and for fastening a corresponding valve plate to the carrier plate, at least one clamping piece by which interacting clamping surfaces are clamped with each other, of which at least one is constructed as an angular surface by which the corresponding valve plate is pressed against the carrier plate.

In the closing unit of the invention, the valve plates are mounted on and can be removed from a carrier plate lying between the valve plates. For fastening a corresponding valve plate onto the carrier plate, at least one clamping piece is used by which interacting clamping surfaces are clamped with each other, of which at least one is constructed as an angular surface by which the corresponding valve plate is pressed against the carrier plate.

Through the at least one angular surface, a force component acting in the direction toward the carrier plate is generated on the corresponding valve plate by which the valve plate is pressed against the carrier plate. A corresponding angular surface is set at an angle to the clamping force acting on the corresponding clamping piece, advantageously at an angle between 20° and 70°, for example, the angle equals 45°.

By pressing the valve plate onto the carrier plate, a stable fastening of the valve plate can be achieved, without wobbling of the valve plate. Here, a positioning of the valve plate relative to the carrier plate with only minimal tolerances can be achieved. The use of clamping pieces allows a simple assembly or disassembly.

Advantageously, for clamping a corresponding clamping piece, at least one clamping screw interacting with the clamping piece is provided, wherein a corresponding angular surface is set at an angle to the axis of the clamping screw, advantageously at an angle between 20° and 70°, for example, the angle equals 45°.

It is preferred that both of the interacting clamping surfaces of the corresponding valve plate and the carrier plate that are clamped with each other by at least one clamping piece and also of the interacting clamping surfaces of the corresponding valve plate and the at least one clamping piece clamped with it, at least one is constructed as an angular surface by which the corresponding valve plate is pressed against the carrier plate. It is especially preferred that all of the clamping surfaces clamped with each other by at least one clamping piece, that is, the clamping surfaces clamped with each other of the corresponding valve plate and the carrier plate and the clamping surfaces clamped with each other of the clamping piece itself and the corresponding valve plate are constructed as angular surfaces by which the corresponding valve plate is pressed against the carrier plate.

In one advantageous embodiment of the invention, a corresponding valve plate has an essentially rectangular construction seen in a view toward the side of the valve plate carrying a seal for closing the corresponding valve opening, in particular, rectangular with rounded corners, with opposing longer sides and opposing shorter sides. With such an essentially rectangular valve plate, an essentially rectangular or slot-shaped valve opening can be closed. The at least one clamping piece clamping the corresponding valve plate advantageously interacts with one of the longer sides of the valve plate, wherein advantageously two or more clamping pieces clamping this valve plate are arranged spaced apart from each other along a longer side of the rectangular valve plate.

One preferred embodiment of the invention provides that a corresponding valve plate can be pushed onto the carrier plate by a guide between the valve plate and the carrier plate, wherein this guide secures the valve plate against lifting from the carrier plate. Here, the valve plate is pushed onto the carrier plate up to the mutual stop of the interacting clamping surfaces of the valve plate and the carrier plate. In this state, the at least one clamping piece is mounted, in order to fix the valve plate. Through this guide, the valve plate is already secured against falling down and is pre-positioned opposite the carrier plate for the assembly of the clamping piece.

For guiding the valve plate relative to the carrier plate, advantageously in one of the two parts at least one undercut groove is constructed in which a projection of the other of the two parts engages, wherein the projection interacts with the undercut side walls (flanks) of the undercut groove. Such a guide could be constructed, in particular, in the form of a dovetailed guide.

A vacuum valve in which a closing unit according to the invention can be used has a valve housing with first and second valve openings that are surrounded by first and second valve seats, wherein the first valve plate can be pressed onto the first valve seat, in order to close the first valve opening and the second valve plate can be pressed against the second valve seat, in order to close the second valve opening.

A vacuum valve according to the invention could form a transfer valve, for example, between a transfer chamber and a process chamber of a processing system for performing vacuum processes.

According to another aspect of the invention, a valve plate for fastening to a carrier plate of a closing unit is provided for a vacuum valve, wherein the valve plate has at least one clamping surface that is constructed in the form of an angular surface and by which the valve plate can be pressed against the carrier plate for clamping of the valve plate with the carrier plate realized by at least one clamping piece. Advantageously, the valve plate has first and second clamping surfaces that are each constructed in the form of angular surfaces and of which the first clamping surface is provided for interacting with a clamping surface of the carrier plate constructed in the form of an angular surface and of which the second clamping surface is provided for interacting with a clamping surface of the at least one clamping piece constructed in the form of an angular surface. Preferably, a groove or a projection is further provided for constructing a guide between the valve plate and the carrier plate, wherein the guide secures the valve plate against lifting from the carrier plate, in particular, is constructed in the form of a dovetailed guide. The track of the guide here stands advantageously at an angle, advantageously at a right angle to the longitudinal extent of a corresponding angular surface of the valve plate.

BRIEF DESCRIPTION OF THE DRAWINGS

Additional advantages and details of the invention will be explained below with reference to the accompanying drawing.

In the drawings:

FIG. 5 is a cross section along the line AA of FIG. 1;

FIG. 6 is a cross section along the line BB of FIG. 1;

FIG. 7 is a view of the carrier plate and the two valve plates in the separated state, wherein they are pushed parallel to each other opposite the connected state in a cross section according to FIG. 6;

FIG. 8 is a longitudinal middle section (section line CC of FIG. 1);

DETAILED DESCRIPTION OF THE PREFERRED EMBODIMENTS

Figure 1:
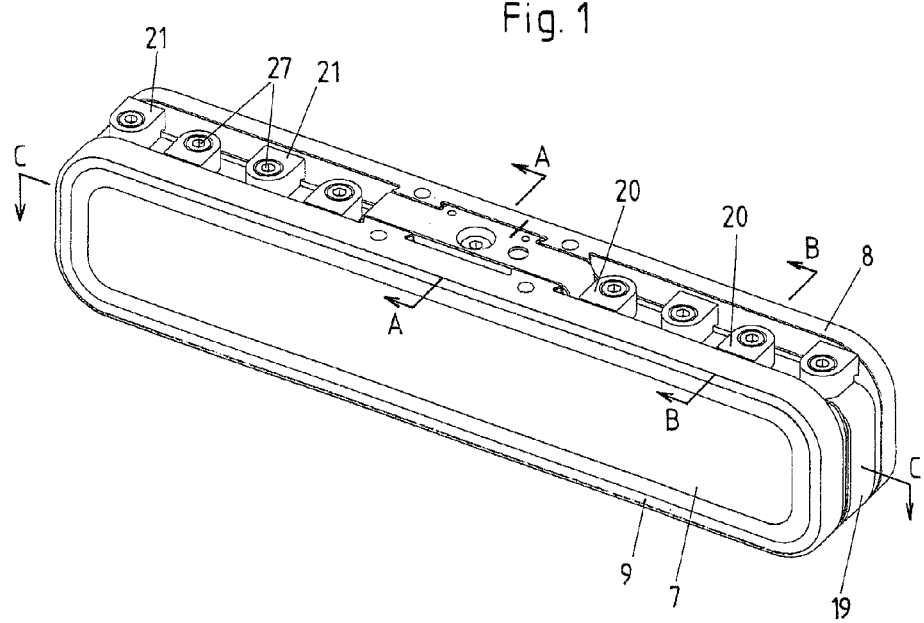
FIG. 1 is a perspective view of a closing unit according to the invention.

One embodiment of a closing unit according to the invention is shown in FIGS. 1 to 8. FIGS. 9 to 12 show an embodiment of a vacuum valve, partially schematized, in which such a closing unit is installed. This vacuum valve has a valve housing 1 with first and second valve openings 2, 3 that are arranged in opposite walls of the valve housing 1. The valve openings 2, 3 lie in the illustrated embodiment in a row, i.e., overlap each other, seen in a view in the direction of the axes 4, 5 of the valve openings 2, 3, wherein advantageously the axes 4, 5 of the valve openings 2, 3 lie parallel to each other and on a common straight line. In particular, the valve openings 2, 3 have the same dimensions.

In the illustrated embodiment, the valve openings 2, 3 have a slot-shaped construction, wherein they have an essentially rectangular cross-sectional shape with significantly larger longer sides than shorter sides. Vacuum valves with such valve openings are used, for example, as transfer valves in semiconductor processing systems. The vacuum valve is here arranged, for example, between a transfer module (=a transfer chamber) and a processing module (=a processing chamber), wherein work pieces to be processed, in particular, wafers that are to be processed in the processing module are guided from the transfer module through the vacuum valve into the processing module. Also, such a vacuum valve could be arranged, for example, between a load-lock module and a transfer module, wherein the work pieces are introduced from the atmosphere area via the load-lock module into the transfer module.

For closing either the first or the second valve opening 2, 3 of the vacuum valve, a closing unit 6 arranged in the valve housing 1 is used, with this closing unit comprising first and second valve plates 7, 8 that each have a seal 9, 10. In the first closed state in which the first valve opening 2 is closed and the second valve opening 3 is opened (cf. FIG. 10), the seal 9 of the first valve plate 7 is pressed against a first valve seat 11 surrounding the first valve opening 2. In contrast, the seal 10 of the second valve plate 8 is lifted from the second valve seat 12 surrounding the second valve opening 3.

In the second closed state in which the second valve opening 3 is closed and the first valve opening 2 is opened (FIG. 11), the seal 10 of the second valve plate 8 is pressed against the second valve seat 12, while the seal 9 of the first valve plate 7 is lifted from the first valve seat 11.

In the completely opened state (cf. FIG. 12), the first and second valve opening 2, 3 are opened, wherein the closing unit 6 does not overlap with the valve openings 2, 3 seen in the direction of the axes 4, 5 of the valve openings 2, 3.

In order to move the closing unit 6 between these states of the vacuum valve, the closing unit 6 is attached to a valve rod 13. The movement of the valve rod 13 is performed with corresponding actuating drives 14, 15, 16.

The adjustment of the closing unit 6 starting from the open position of the vacuum valve (FIG. 12) into one of the closed states of the vacuum valve (FIG. 10 or FIG. 11) is performed via an intermediate position in which the closing unit 6 covers the valve openings 2, 3 seen in the direction of the axes 4, 5 of the valve openings 2, 3, but is lifted from the valve seats 11, 12. The closing unit 6 is thus located in this intermediate position between the positions shown in FIGS. 10 and 11.

For adjusting the closing unit 6 between the intermediate position and a position pressed against one of the valve seats 11, 12, in the illustrated embodiment the valve rod 13 is pivoted about an axis 17 at a right angle to the valve rod 13. As actuating drives 14, 15 for pivoting the valve rod 13 about the axis 17, piston-cylinder units are shown schematically. For adjusting the valve rod 13 between its intermediate position and the open position shown in FIG. 12, a piston-cylinder unit is likewise shown schematically as the actuating drive 16. The cylinder of this piston-cylinder unit is supported so that it can pivot about the axis 17 relative to the valve housing 1 or a drive housing 18 connected rigidly to this housing. The actuating drives 14, 15 interact with the cylinder of the actuating drive 16, in order to pivot this about the axis 17.

Such vacuum valves in which pressing a closing unit 6 against one or alternatively against one of two opposite valve seats 11, 12 is realized by pivoting a valve rod to which the closing unit is attached are known, for example, from the prior art named in the introduction to the description.

It would also be possible to construct the valve rod 13 so that it can move in a linear motion in the direction of the axes 4, 5 of the valve openings 2, 3, for example, by a linear guide for the cylinder of the actuating drive 16, in order to press the closing unit 6 against one of the valve seats 11, 12 through a linear motion starting from the intermediate position.

Other actuating drives 14, 15, 16 than in the form of piston-cylinder units are possible.

The construction of the closing unit 6 will be explained in detail below with reference to FIGS. 1 to 8. The two valve plates 7, 8 are fastened detachably to a carrier plate 19, wherein the carrier plate 19 lies between the two valve plates 7, 8. With a side surface that is formed by one of the large surfaces of the valve plate 7, 8, a corresponding valve plate 7, 8 contacts a side surface of the carrier plate 19, wherein this side surface of the carrier plate is formed by a corresponding surface of the large surfaces of the carrier plate 19. The seal 9, 10 of the corresponding valve plate 7, 8 is arranged on the side surface that forms the other large surface of the valve plate and lies opposite the side surface contacting the carrier plate 19.

Thus, one of the valve plates 7, 8 contact the two side surfaces of the carrier 19 that form the two large surfaces of the carrier plate 19 and point in opposite direction.

The annular, elastic seals 9, 10 are constructed, for example, in the form of O-rings that are used in grooves of the valve plates 7, 8. For example, a construction in the form of vulcanized, annular seals is also possible.

For fastening the first valve plate 7 to the carrier plate 19, clamping pieces 20 are used; for fastening the second valve plate 8 to the carrier plate 19, clamping pieces 21 are used. The clamping pieces 20, 21 have clamping surfaces 22, wherein the clamping surfaces 22 of the clamping pieces 20 interact with a first clamping surface of the first valve plate 7 and the clamping surfaces 22 of the clamping pieces 21 interact with a first clamping surface 23 of the second valve plate 8.

The first and second valve plates 7, 8 furthermore each have a second clamping surface 24 that interacts with a corresponding clamping surface 25, 26 of the carrier plate 19.

By use of the clamping pieces 20, 21, the interacting clamping surfaces 22, 23 of the clamping pieces and the corresponding valve plate 7, 8 and the interacting clamping surfaces 24, 25, 26 of the corresponding valve plate 7, 8 and the carrier plate 19 are clamped with each other. For this purpose, clamping screws 27 are used by which the clamping pieces 20, 21 are screwed with the carrier plate 19. The clamping screws 27 pass through openings in the clamping pieces 20, 21 in the illustrated embodiment and are screwed into threaded boreholes 37 of the carrier plate 19.

The clamping surfaces 22-26 are constructed as interacting angular surfaces. Here, "angular surfaces" means that these clamping surfaces 22-26 or their surface normals are at an angle to the clamping force F (this is shown symbolically in FIG. 6) with which the clamping pieces 20, 21 are clamped against the valve plates 7, 8. For example, the angle 28 between the corresponding clamping surface 22-26 and the clamping force F lies in the range between 30° and 60°, advantageously at approximately 45°. The inclined arrangement of the clamping surfaces 22-26 is such that, through interacting clamping surfaces 22-26, a force component Fk acting on the corresponding valve plate 7, 8 in the direction toward the carrier plate 19 is generated. A normal force Fn at a right angle to the interacting angular surfaces and transmitted by the angular surfaces and its decomposition into the force component Fk directed in the direction toward the carrier plate 19 and a force component acting parallel to the carrier plate 19 is likewise shown in FIG. 6.

The clamping force F lies parallel to the axis 29 of the corresponding clamping screw 27.

Advantageously, several clamping pieces 20, 21 act on each of the valve plates 7, 8 from the same side, wherein the axes 29 of the clamping screws 27 lie parallel to each other.

In the illustrated embodiment, the valve plates 7, 8 have an essentially rectangular form seen in the view toward one of their large sides (rectangular with rounded corners). The clamping pieces 20, 21 act on one of the longer sides of the corresponding valve plate 7, 8, wherein they are spaced apart from each other along this longer side. Advantageously, the threaded boreholes 37 holding the clamping screws 27 are here arranged at the end on one of the narrow sides of the carrier plate, wherein the threaded boreholes 37 holding the clamping screws 27 for the clamping pieces 20 for the first valve plate 7 and the threaded boreholes 37 holding the clamping screws 27 for the clamping pieces 21 for the second valve plate 8 are screwed into the same narrow side of the carrier plate 19.

In a cross section lying parallel to the clamping force F through the corresponding valve plate 7, 8, the clamping surfaces 23, 24 are arranged in the illustrated embodiment on the side flanks of a projection of the corresponding valve plate 7, 8 directed toward the carrier plate 19. The surface normals to these clamping surfaces 23, 24 are here pointed away from a central plane 30 (cf. FIG. 7) of the carrier plate 19, wherein with the center plane 30 they enclose an angle 31 not equal to 90°, advantageously the angle 31 lies in the range between 20° and 70°, e.g., at approximately 45°. With increasing distance from the center plane 30 of the carrier plate 19, the clamping surfaces 23, 24 approach each other. Overall, the projection having the clamping surfaces 23, 24 has a form like a dovetailed connection.

The surface normal to the clamping surface 25, 26 of the carrier plate 19 is directed toward the central plane 30, wherein it encloses an angle 32 which is not equal to 90° with the central plane 30, advantageously the angle 32 lies in the range between 20° and 70°, e.g., at approximately 45°.

In the assembled position, the surface normal to the clamping surface 22 of the clamping piece 20, 21 is directed toward the central plane 30 of the carrier plate 19 and encloses, with the central plane 30, an angle not equal to 90°, advantageously, this angle lies in the range between 20° and 70°, e.g., at approximately 45°.

The center plane 30 of the carrier plate 19 contacts centrally between the two side surfaces of the carrier plate 19 at which the first and second valve plates 7, 8 contact. In the state of the carrier plate 19 mounted on the valve rod 13, the center plane 30 lies advantageously parallel to the valve rod 13.

The valve plates 2, 3 are further connected by guides to the carrier plate 19 by which they can be pushed onto the carrier plate 19. Through these guides, the valve plates 7, 8 are also secured against displacement relative to the carrier plate 19 in a direction that lies at a right angle to the direction of the clamping force F and parallel to the center plane 30.

Such securing against displacement of the corresponding valve plate 7, 8 relative to the carrier plate 19 in this direction could also be achieved in other ways, for example, by projections and recesses that interact with each other with a positive fit in the carrier plate 19 and the valve plates 7, 8.

The guide constructed between the corresponding valve plate 7, 8 with the carrier plate 19, however, is also used for holding the corresponding valve plate 7, 8 on the carrier plate 19, as long as, for the assembly of the corresponding valve plate 7, 8 on the carrier plate 19, the clamping pieces 20, 21 are not yet mounted, in that it secures the corresponding valve plate 7, 8 against lifting from the carrier plate 19.

For constructing such a guide that is constructed as a slide guide, the corresponding valve plate 7, 8 has on its side surface directed toward the carrier plate 19 an undercut groove 33 in which a projection 34 engages that is arranged on the carrier plate 19 and interacts with the undercut side walls or flanks of the groove 33, so that lifting of the corresponding valve plate 7, 8 from the carrier plate 19 is prevented. As can be seen, in particular, from FIG. 8, the projection 34 has undercut side walls or flanks that interact with the undercut side walls of the groove 33. The undercut side walls of the groove 33 and the undercut side walls of the projection 34 form guide surfaces of the guide between the corresponding valve plate 7, 8 and the carrier plate 19. Advantageously, this guide is constructed in the form of a dovetailed guide, as is visible from the drawings. Other shapes of undercut grooves 33 or projections 34 with undercut side walls are likewise conceivable and possible. The undercut groove could also be constructed on the carrier plate 19 and the projection 34 on the valve plate 7, 8.

The direction in which the corresponding valve plate 1, 2 is guided through this guide constructed as a linear guide relative to the carrier plate 19 lies parallel to the clamping force F in the illustrated embodiment, as is preferred.

The corresponding valve plate 7, 8 can be pushed onto the carrier plate by the guide constructed between the corresponding valve plate 7, 8 and the carrier plate 19 up to the mutual stop of the interacting clamping surfaces 24, 25, 26 of the corresponding valve plate 7, 8 and the carrier plate 19. The pushing is limited by this stop.

If the valve plate 7, 8 is pushed from above onto the carrier plate 19, then the valve plate 7, 8 is thus secured against falling down. Furthermore, the valve plate 7, 8 is pre-positioned opposite the carrier plate 19, before the clamping pieces 20, 21 are tightened.

Figure 3:
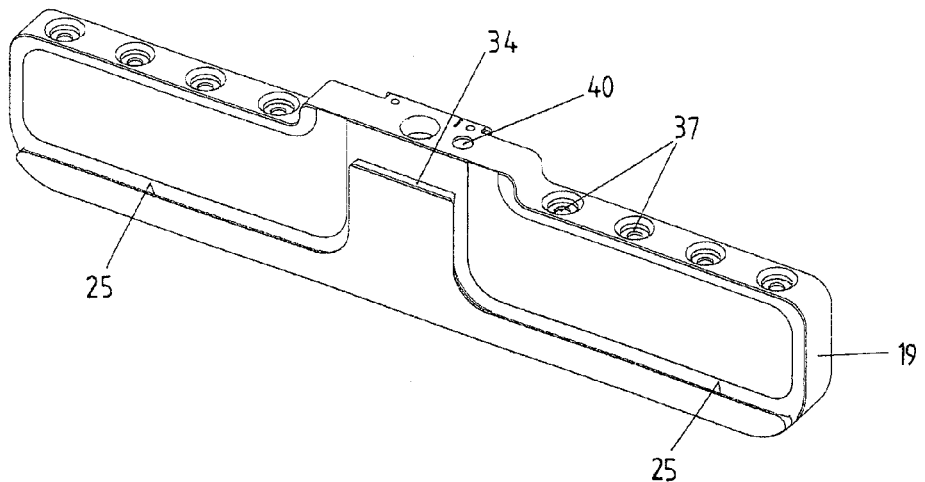
FIG. 3 is a perspective view of the carrier plate.

From FIG. 3, the side surface facing the first valve plate 7 is visible on which the projections 34 and the clamping surface 25 are arranged. The opposite side surface has, in principle, an identical construction, only there the projection 34 reaches up to the upper edge (it could also reach on both sides up to the upper edge or could end at a distance from the upper edge on both sides).

Figure 2:
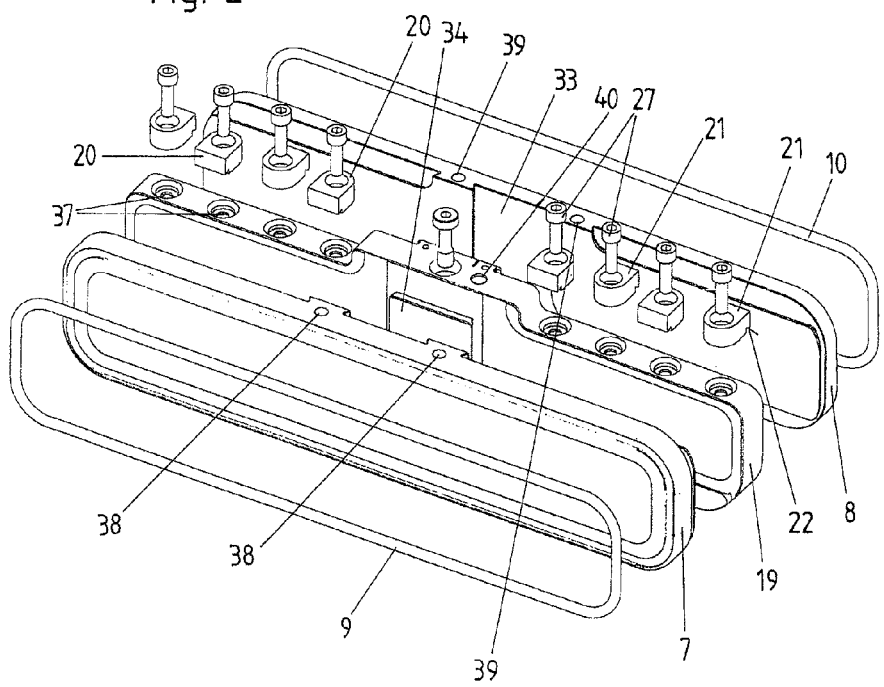
FIG. 2 is an exploded view of the closing unit of FIG. 1.

From FIGS. 1 and 2, the side surface of the first valve plate 7 facing away from the carrier plate 19 is visible on which the seal 9 is arranged. The surface of the second valve plate 8 facing away from the carrier plate 19 on which the seal 10 is arranged has an identical construction.

Figure 4:
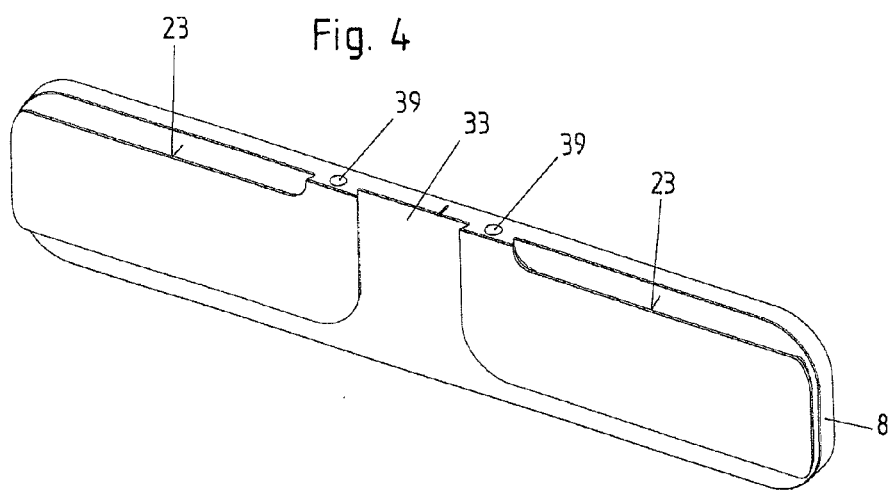
FIG. 4 is a perspective view of the valve plate alone lying behind in FIGS. 1 and 2.
Figure 9:
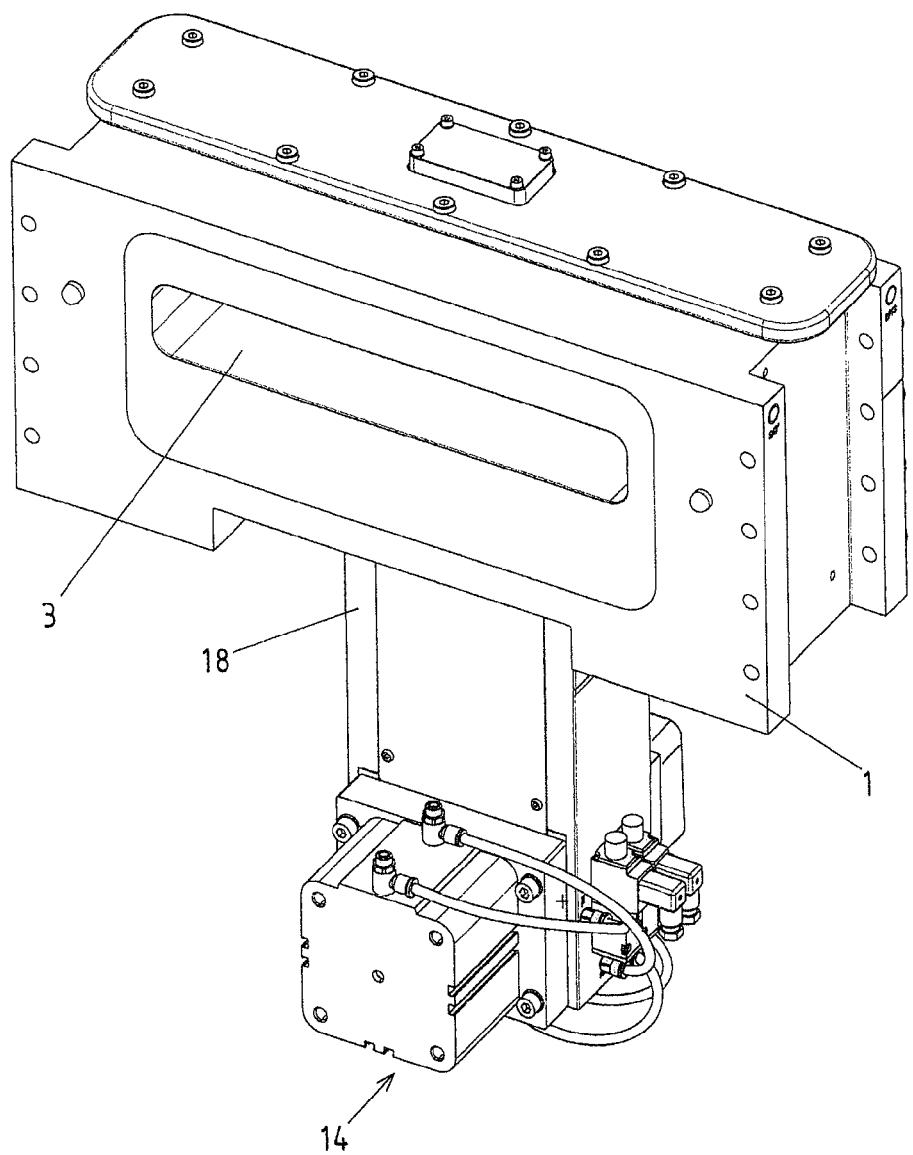
FIG. 9 is a perspective view of a vacuum valve with a closing unit according to FIG. 1.
Figure 10:
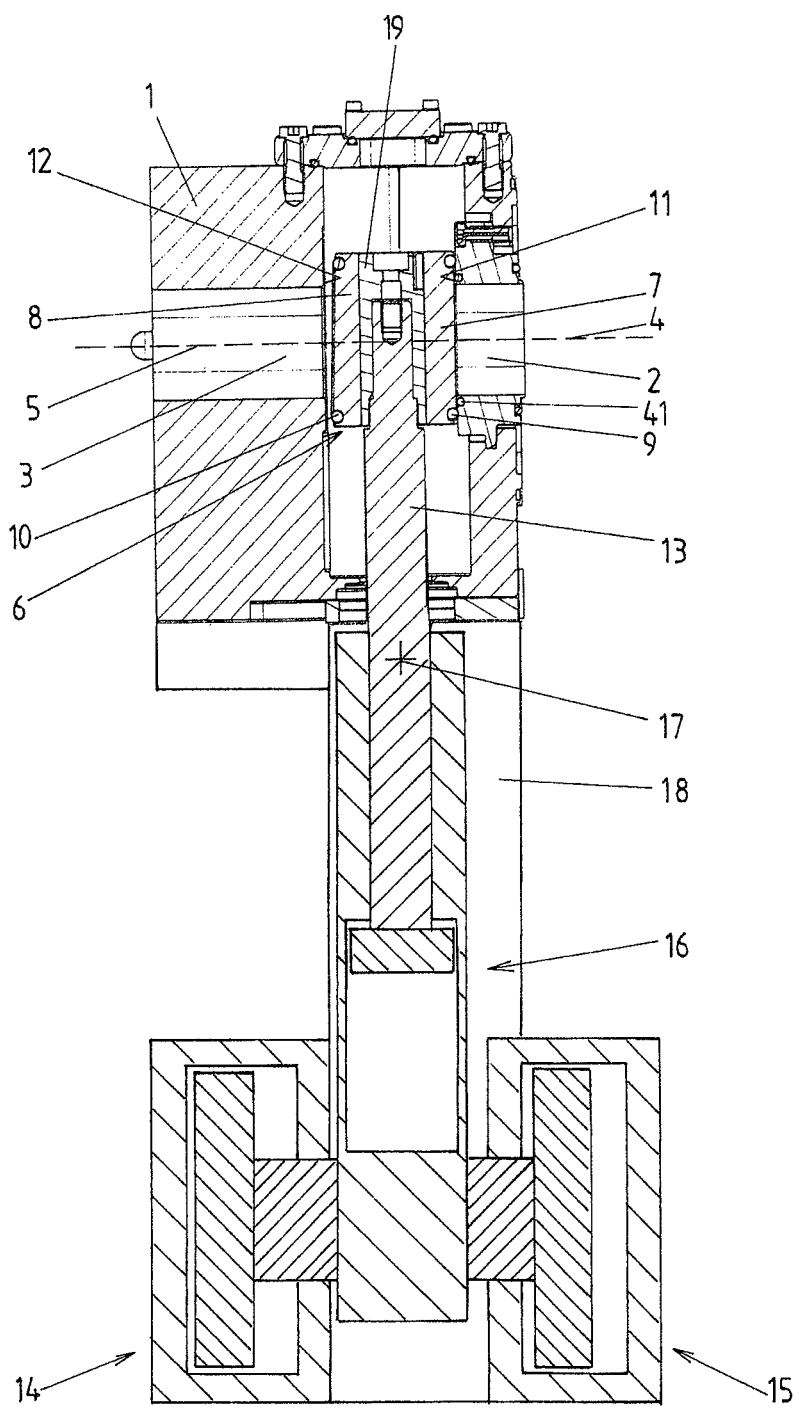
FIG. 10 is a section view through the vacuum valve in a first closed position.
Figure 11:
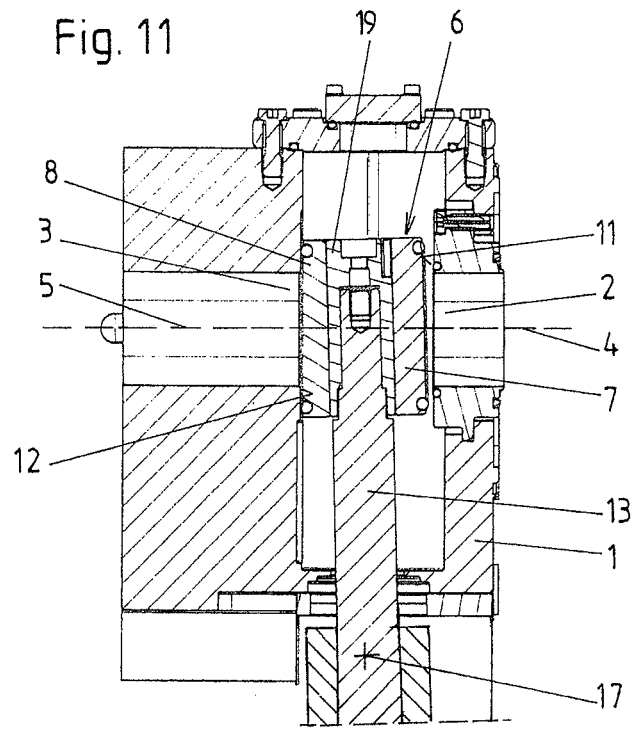
FIG. 11 is a section view according to FIG. 10 of a part of the vacuum valve in a second closed position.
Figure 12:
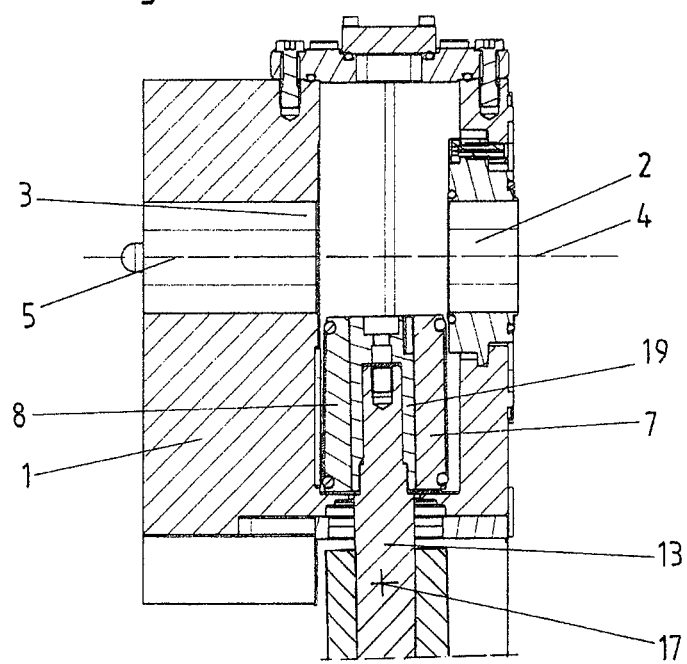
FIG. 12 is a section view according to FIG. 10 of a part of the vacuum valve in the open position.

From FIG. 4, the side surface of the second valve plate 8 facing the carrier plate 19 on which the undercut groove 33 and the first and second clamping surfaces 23, 24 are arranged is visible. The side surface of the first valve plate 11 facing the carrier plate 19 has an identical construction.

Despite the tilting of the valve rod about the axis 17 during the closing of one of the valve openings 2, 3, in order to maintain a pressing of the seal that is uniform across the periphery of the corresponding seal 9, 10 in the state of the closing unit 6 pressed against the corresponding valve seat 11, 12, the two side surfaces of the valve plates 7, 8 facing away from the carrier plate 19 are at an angle relative to each other. In the embodiment, the enclosed angle lies at 1.6°, but according to the application could also be greater or smaller; for example, here it could lie in the range between 1° and 3°.

This angled position is reached in the embodiment by a wedge-shaped construction of the second valve plate 8. Both valve plates 7, 8 could also have wedge-shaped constructions and/or the carrier plate 19 could have a wedge-shaped construction (each with respect to a cross section).

Instead of such an angled arrangement of the two side surfaces of the valve plates 7, 8 facing away from the carrier plate 19, it would also be possible, for example, to support the carrier plate 19 so that it can tilt relative to the valve rod 13. Such supports that can tilt are known, for example, from the prior art according to U.S. Pat. No. 6,471,181 B2 named in the introduction to the description. A support that can tilt for the carrier plate relative to the valve rod could also be achieved, for example, by a sufficiently elastic connection element made from metal by which the carrier plate is connected to the valve rod. An angled arrangement is then also not required, if instead of a tilting of the valve rod about the axis 17, a linear displacement of the valve rod 13 is performed, in order to press the closing unit 6 against one of the two valve seats 11, 12 starting from the intermediate position.

The connection of the carrier plate 19 to the valve rod 13 can be realized, for example, as shown, in that one end of the valve rod 13 is inserted into a receptacle opening 35 of the carrier plate 19 and from the opposite side of the carrier plate 19 a connection screw 36 projects through one borehole into the carrier plate 19 and is screwed into a thread formed on the end of the valve rod 13. The axes of the connection screw 36 and the valve rod 13 lie parallel to the center plane 30 of the carrier plate 19. Here, a limited pivoting capability of the carrier plate 19 about the axis of the valve rod 13 could be constructed in the state connected to each other, in order to allow adjustment of the position of the closing unit 6 relative to the valve seats 11, 12. Such a construction is known for the connection of valve rods to valve plates, for example, from the prior art according to U.S. Pat. No. 7,134,642 B2 named above.

The valve plates 7, 8 each have on their narrow side that lies at the top in the position of use of the vacuum valve, wherein this is the narrow side facing away from the valve rod 13, advantageously at least one threaded borehole 38, 39 in which a tool can be screwed for the assembly and disassembly, in order to attach or to detach the valve plate 7, 8. Such a manipulation with a tool is known, for example, from the prior art according to U.S. Pat. No. 7,134,642 B2 named in the introduction to the description. Advantageously, the carrier plate 19 likewise has on its narrow side lying at the top in the assembled position such a threaded borehole 40, so that this can be carried during its assembly onto or disassembly from the valve rod 13 by screwing the tool.

On the side of the processing chamber, in the illustrated embodiment the valve housing has a removable insert that has, on the side facing the valve plate, a seal 41 that lies between the seal 9 and the valve opening 2 and should protect the seal 9 from attack of a gas let into the processing chamber. The valve plate 7 and the insert having the seal 41 could be provided with a coating protecting against processing gases.

A force component Fk directed in the direction toward the carrier plate 19 could also be constructed if only one of the two interacting clamping surfaces 22-26 is constructed as an angular surface, wherein a construction of both interacting clamping surfaces as angular surfaces is preferred. Pressing the corresponding valve plate 7, 8 against the carrier plate 19 could also be achieved if either only, of the interacting clamping surfaces of the corresponding clamping piece 20, 21 and the corresponding valve plate 7, 8, at least one, advantageously two is or are constructed as angular surfaces or only, of the interacting clamping surfaces between the corresponding valve plate 7, 8 and the carrier plate 19, at least one, advantageously two is or are constructed as angular surfaces. It is preferred, however, if at least one angular surface, advantageously two interacting angular surfaces act between the corresponding clamping piece 20, 21 and the corresponding valve plate 7, 8 and at least one angular surface, advantageously two interacting angular surfaces act between the corresponding valve plate 7, 8 and the carrier plate 19.

According to the play of the guide between the corresponding valve plate 7, 8 and the carrier plate 19, the guide surfaces disengage when the clamping pieces 20 or 21 are tightened.

The clamping surfaces 25, 26 of the carrier plate 19 could also be arranged on the edge of the projection 34 lying at the top in the figures (that is, the edge of the projection 34 pointing in the opposite direction in which the corresponding valve plate 7, 8 is pushed). The second clamping surface 24 of the corresponding valve plate 7, 8 interacting with this clamping surface 25, 26 would then be arranged on an edge of the groove 33 bordering the groove 33 in FIG. 4 at the top. So that the clamping surfaces 22 and 25 or 26 and the clamping surfaces 23 and 24 were advantageously spaced apart in the direction of the clamping force F, the projection 34 would preferably reach somewhat less far upward than is shown for the side of the carrier plate 19 lying at the front in FIG. 3.

In turn, here the projection 34 could also be arranged on the corresponding valve plate 8 and the groove 33 on the carrier plate 19.

A corresponding guide for the corresponding valve plate 8 relative to the carrier plate 19 could also comprise two grooves 33 that interact with two projections 34, wherein the two grooves 33 or the two projections 34 could be arranged on both sides of the central region of the carrier plate 19 (to which the valve rod attaches) or the valve plate 7, 8 and spaced apart from this central region. The projections and grooves would have, in turn, undercut side walls for preventing the lifting of the valve plates 7, 8 from the carrier plate 19.

For simplifying the insertion, the grooves could have a widened construction on the insertion side (V-shaped in the view toward the corresponding groove) and/or the projections could have a tapering construction on the insertion side (V-shaped in the view toward the corresponding projection). Interacting clamping surfaces could be constructed as described above, in turn, on the edges of the grooves and projections that limit the pushing of the valve plates 7, 8 on the carrier plate 19. The interacting clamping surfaces 22 of the clamping pieces 21 and first clamping surfaces 23 of the valve plates 7, 8 could also each be arranged spaced apart from the central region of the corresponding valve plate 7, 8 or the carrier plate 19. Thus, the connection between the carrier plate 19 and the corresponding valve plate 7, 8 would be performed only in two regions that are spaced apart on both sides from the connection region with the valve rod 13. The carrier plate 19 could here be weakened in sections that run between the corresponding connection region with the corresponding valve plate 7, 8 and the connection region with the valve rod 13 and could here have a spacing from the corresponding valve plate 7, 8 across these sections. In this way, one possibility for twisting the carrier plate 19 could be constructed, wherein a certain tilting (rotation) of the valve plates 7, 8 about an axis at a right angle to the valve rod 13 is enabled. Such a support that can tilt could replace the also possible, already named support that can tilt according to U.S. Pat. No. 6,471,181 B2.

As carrier plates in the sense of this publication to which valve plates can be attached in the described way, different constructions of parts carrying the valve plates are to be understood that have at least plate-shaped sections to which the valve plates are pressed in the mounted state. In-between, there could also be rod-shaped sections of the carrier plate that are constructed, for example, as described according to a kind of torque rod.

If the clamping of the valve plates 7, 8 with the carrier plate 19 is performed only in two regions that are spaced apart from the connection region of the carrier plate 19 to the valve rod 13 and lie on opposite sides of this connection region, then also only a single guide securing the lifting of the valve plate from the carrier plate could be provided for each of the valve plates 7, 8, wherein this guide is arranged at a distance from the connection region of the carrier plate 19 to the valve rod 13. Clamping as a consequence of different heat expansions could therefore be prevented.

As emerges from the above description, the region of the invention is not limited to the illustrated embodiment, but instead should be defined with respect to the accompanying claims together with its full range of possible equivalents.

LEGEND TO THE REFERENCE SYMBOLS

1 Valve housing
2 Valve opening
3 Valve opening
4 Axis
5 Axis
6 Closing unit
7 First valve plate
8 Second valve plate
9 Seal
10 Seal
11 First valve seat
12 Second valve seat
13 Valve rod
14 Actuating drive
15 Actuating drive 16 Actuating drive
17 Axis
18 Drive housing
19 Carrier plate
20 Clamping piece
21 Clamping piece
22 Clamping surface
23 First clamping surface
24 Second clamping surface
25 Clamping surface
26 Clamping surface
27 Clamping screw
28 Angle
29 Axis
30 Center plane
31 Angle
32 Angle
33 Groove
34 Projection
35 Receptacle opening
36 Connection screw
37 Threaded borehole
38 Threaded borehole
39 Threaded borehole
40 Threaded borehole
41 Seal

The invention claimed is:

1. A closing unit for a vacuum valve comprising:
a first valve plate for closing a first valve opening of the vacuum valve,
a second valve plate for closing a second valve opening of the vacuum valve,
a carrier plate that lies between the valve plates and to which the valve plates are fastened detachably, and
at least one clamping piece by which interacting clamping surfaces are clamped to each other for fastening each of the valve plates to the carrier plate, at least one of the interacting clamping surfaces is constructed as an angular surface by which each of the valve plates is pressed onto the carrier plate,
at least one clamping screw interacting with the clamping piece for clamping the clamping piece by exerting a clamping force onto the clamping piece, and
a guide for each of the first and second valve plates, which is constructed between the respective valve plate and the carrier plate and by which the valve plate is guided along a guide path,
wherein for joining the respective valve plate with the carrier plate, the valve plate is inserted in the guide and moved relative to the carrier plate along the guide path up to an end position in which the interacting clamping surfaces of the carrier plate and the valve plate, which are distanced before reaching the end position and approach each other when moving the valve plate along the guide path towards the end position, come into mutual engagement and wherein the guide secures the valve plate against lifting from the carrier plate.

2. The closing unit according to claim 1, wherein the at least one clamping piece clamps the interacting clamping surfaces of the valve plates and the carrier plate as well as the interacting clamping surfaces of the valve plates and the clamping piece together with each other.

3. The closing unit according to claim 1, wherein all of the clamping surfaces clamped with each other are constructed as angular surfaces by which the corresponding valve plates are pressed onto the carrier plate.

4. The closing unit according to claim 1, wherein a corresponding one of the valve plates is clamped with the carrier plate by two or more clamping pieces.

5. The closing unit according to claim 4, wherein the clamping pieces that clamp a corresponding one of the valve plates with the carrier plate are arranged spaced apart from each other along a longer side of the valve plate, which is essentially rectangular.

6. The closing unit according to claim 1, wherein, for forming a force component acting on the corresponding valve plate in a direction toward the carrier plate, a surface normal of a clamping surface is directed toward a central plane of the carrier plate, and the clamping surface is constructed as an angular surface arranged on the carrier plate and interacts with a clamping surface arranged on one of the valve plates.

7. The closing unit according to claim 1, wherein, for forming a force component acting on the corresponding valve plate in a direction toward the carrier plate, a surface normal of a clamping surface is directed toward a central plane of the carrier plate, and the clamping surface is constructed as an angular surface arranged on the corresponding clamping piece and interacts with a clamping surface arranged on one of the valve plates.

8. The closing unit according to claim 1, wherein, for guiding the corresponding valve plate relative to the carrier plate, the valve plate or the carrier plate has an undercut groove with undercut side walls and the other of the valve plate and the carrier plate has a projection that engages in the undercut groove and interacts with the undercut side walls of the undercut groove.

9. The closing unit according to claim 1, wherein a track specified by the guide between the corresponding valve plate and the carrier plate is oriented parallel to the clamping force acting on the corresponding clamping piece.

10. A vacuum valve comprising:
a valve housing with a first valve opening that is surrounded by a first valve seat and a second valve opening that is surrounded by a second valve seat, and
a closing unit arranged in the valve housing,
the closing unit comprising
a first valve plate for closing the first valve opening of the valve housing,
a second valve plate for closing the second valve opening of the valve housing,
a carrier plate that lies between the valve plates and to which the valve plates are fastened detachably, and
at least one clamping piece by which interacting clamping surfaces are clamped with each other for fastening a corresponding valve plate to the carrier plate, at least one of the interacting clamping surfaces is constructed as an angular surface by which the corresponding valve plate is pressed against the carrier plate,
at least one clamping screw interacting with the clamping piece for clamping the clamping piece by exerting a clamping force onto the clamping piece, and
a guide for each of the first and second valve plates, which is constructed between the respective valve plate and the carrier plate and by which the valve plate is guided along a guide path,
wherein for joining the respective valve plate with the carrier plate, the valve plate is inserted in the guide and moved relative to the carrier plate along the guide path up to an end position in which the interacting clamping surfaces of the carrier plate and the valve plate, which are distanced before reaching the end position and approach each other when moving the valve plate along the guide path towards the end position, come into mutual engagement and wherein the guide secures the valve plate against lifting from the carrier plate.

11. A vacuum valve according to claim 10, wherein the closing unit is attached to a valve rod by which the closing unit can be adjusted between an open position releasing the first and second valve opening, an intermediate position covering the first and second valve opening viewed in a direction of axes of the first and second valve opening but lifted from the first and second valve seats, a first closed position in which the first valve plate is pressed against the first valve seat and the second valve plate is lifted from the second valve seat, and a second closed position in which the second valve plate is pressed against the second valve seat and the first valve plate is lifted from the first valve seat.

12. A valve plate for fastening to a carrier plate of a closing unit comprising
at least one clamping surface constructed as an angular surface by which the valve plate can be pressed against the carrier plate by a clamping of the valve plate with the carrier plate by at least one clamping piece,
a groove or a projection arranged on a side of the valve plate intended to face the carrier plate in the mounted state of the valve plate, the groove or projection having undercut side walls which form guide surfaces defining a guide path for guiding the valve plate relative to the carrier plate when joining the valve plate and the carrier plate, wherein the guide path stands at an angle to a direction of a longitudinal extent of the clamping surface formed as an angular surface.

13. The valve plate according to claim 10, wherein the at least one clamping surface constructed in the form of an angular surface forms a stop for limiting a pushing of the valve plate on the carrier plate.

14. The closing unit according to claim 1, wherein the at least one clamping surface is constructed as an angular surface and is set at an angle between 20° and 70° to the clamping force acting on the clamping piece.

15. The vacuum valve according to claim 10, wherein the at least one clamping surface is constructed as an angular surface and is set at an angle between 20° and 70° to the clamping force acting on the clamping piece.

16. The vacuum valve according to claim 10, wherein the guide path specified by the guide between the corresponding valve plate and the carrier plate is oriented parallel to the clamping force acting on the corresponding clamping piece.

17. The valve plate according to claim 12, wherein the guide path stands at a right angle to the direction of longitudinal extent of the clamping surface constructed as an angular surface.

* * * * *